United States Patent [19]

Yokosouchi et al.

[11] Patent Number: 4,940,439

[45] Date of Patent: Jul. 10, 1990

[54] METHOD OF AND APPARATUS FOR MANUFACTURING BRAUN TUBES

[75] Inventors: Teruo Yokosouchi, Chiba; Takumi Karasawa, Sakura; Katuhisa Oono, Ibaraki, all of Japan

[73] Assignee: Hitachi, Ltd., Tokyo, Japan

[21] Appl. No.: 287,035

[22] Filed: Dec. 21, 1988

[30] Foreign Application Priority Data

Dec. 25, 1987 [JP] Japan ............................... 62-326918

[51] Int. Cl.[5] ............................................ H01S 9/32

[52] U.S. Cl. .................................... 445/5; 156/274.8; 156/294; 156/380.2; 156/424; 156/556; 445/72

[58] Field of Search ..................... 156/303.1, 294, 293, 156/423, 424, 272.2, 272.4, 274.4, 274.8, 275.1, 275.3, 275.7, 275.5, 379.6, 380.2, 556, 566; 198/803.14; 414/157, 160, 196, 222; 29/430, 230; 445/5, 6, 22, 72, 802; 313/447

[56] References Cited

U.S. PATENT DOCUMENTS

| | | | |
|---|---|---|---|
| 1,330,702 | 2/1920 | Harrington | 156/424 |
| 1,403,800 | 1/1922 | Malcomlson | 156/424 |
| 2,097,467 | 11/1937 | Prescott | 445/72 |
| 3,576,247 | 4/1971 | Caulford | 198/803.14 |
| 3,698,786 | 10/1972 | Gronica | 445/5 |
| 3,966,287 | 6/1976 | Liller | 445/5 |
| 4,457,731 | 7/1984 | Patrickson | 445/5 |
| 4,802,223 | 4/1989 | Benigni | 445/5 |

FOREIGN PATENT DOCUMENTS

| | | | |
|---|---|---|---|
| 0202223 | 2/1959 | Fed. Rep. of Germany | 445/802 |
| 0142734 | 8/1983 | Japan | 445/5 |
| 0112538 | 6/1984 | Japan | 445/5 |
| 0430840 | 6/1935 | United Kingdom | 445/802 |
| 0499682 | 1/1939 | United Kingdom | 445/802 |

*Primary Examiner*—Merrell C. Cashion, Jr.

*Attorney, Agent, or Firm*—Antonelli, Terry, Stout & Kraus

[57] ABSTRACT

A Braun-tube manufacturing apparatus comprises conveyor for conveying a Braun tube having a support portion arranged to stably support the Braun tube thereon stationary thereto with a faceplate thereof facing down, and a drying furnace disposed at an intermediate position on a conveying path of the conveyor for locally heating an area around the base where the resin is deposited to thereby dry and harden the adhesive resin. Such an apparatus enables not only rapid and reliable drying of the adhesive resin but also reductions in the size and cost of the drying furnace which can be used for drying.

15 Claims, 5 Drawing Sheets

METHOD OF AND APPARATUS FOR MANUFACTURING BRAUN TUBES

BACKGROUND OF THE INVENTION

1. Field of the Invention

The present invention relates to a method of and an apparatus for attaching a base to a Braun tube by means of an adhesive resin and then effecting knocking and, more particularly, to a method of and an apparatus for bonding a base to a Braun tube by drying and hardening or curing such an adhesive resin.

2. Description of the Related Art

In typical Braun-tube manufacturing processes, after completion of evacuation, Braun tubes are subjected to pre-knocking, activation of cathodes, aging of electron guns, and post-knocking.

Related art which will be described hereinafter with reference to FIGS. 7 and 8 is one of the techniques which had been secretly carried out when the present inventors made the invention, but the present inventors have not found any written publication which indicates that such a related art is publicly known.

As shown in FIG. 7, the step of attaching a base 102 to a Braun tube 101 by means of an adhesive resin 103 is performed after the step of exhaustion. In this case, the knocking and aging steps of the electron gun are carried out while the Braun tube 101 is being conveyed which is suspended from a trolley hanger 104 with its faceplate 120 facing up. Drying and curing of the adhesive resin 103 interposed between the Braun tube 101 and the base 102 is carried out by naturally drying the adhesive resin 103 while the Braun tube 101 is suspended from the trolley hanger 104.

In such related art, however, since the adhesive resin 103 is dried by natural drying process, such a drying step requires a long time period and, therefore, the productivity is low. Further, since the adhesive resin 103 is naturally dried while the Braun tube 101 is being conveyed with the base 102 facing down, the base 102 may be deviated from a predetermined mounting position on the Braun tube 101. Furthermore, if the adhesive resin 103 does not satisfactorily dry, the position of the base 102 may be deviated, as shown in FIG. 8, due to its weight or vibration. If a knocking voltage is applied across electrodes for cleaning when the adhesive resin 103 still contains moisture, the internal resistances among a plurality of pin terminals 127 connected to the socket 105 decrease under the influence of water or an acidic solution contained in the adhesive 103, and a proper knocking voltage may not be applied across the electrodes.

In general, in order to increase the withstand voltage among the pins 127 connected to the socket 105 after the drying step, a silicone-type resin solution (semisolid) is used as an adhesive. Particularly in recent years, the high voltage of Braun tubes has been increased from 25 to 30 kV or higher. Accordingly, it has become important for the withstand voltage of the insulation resistance among electrodes to be kept sufficiently high. Therefore, it is desired to solve the above-described problems.

Japanese Patent Examined Publication No. 29-6510 discloses a method of bonding a base to the bulb of an electron tube such as a vacuum tube by using an adhesive. The method comprises the steps of embedding in advance a metal ring in the adhesive, supplying high-frequency electromagnetic energy to the metal ring to cause induction heating therein, heating the adhesive from the inside thereof, and hardening the adhesive.

The disclosed technique is suitable for application to tubes such as vacuum tubes of low anode or plate voltage, but it is not practical to apply the art to Braun tubes because of the low withstand voltage among pin terminals.

Japanese Patent Unexamined Publication No. 59-119656 (corresponding to GB 2,132,012A) discloses a technique in which a protecting base having high withstand voltage characteristic is attached to an electron tube as rapidly as possible by directly forming the base by a casting process and covering a sealed exhaust portion formed at the end of the neck of the electron tube (a portion at which a thin tube part used for exhaustion of the electron tube is sealed).

However, the disclosed technique does not employ any adhesive resin, but may provide an obstacle to formation of a continuous manufacturing line. In addition, it would be difficult in this technique to firmly secure the protecting base to the body of an electron tube without a long exhaust portion.

SUMMARY OF THE INVENTION

It is, therefore, a first object of the present invention to provide a method and an apparatus for manufacturing Braun tubes by utilizing an adhesive resin, both of which enable not only rapid and reliable drying of the adhesive resin but also the use of small-scale drying furnace, as well as reduction in the total manufacturing cost.

It is a second object of the present invention to provide a method for manufacturing Braun tubes, in which after a socket for a knocking step has been attached to a base, the position of the base is not deviated and the insulation resistances among a plurality of pin terminals connected to the socket do not decrease, as well as an apparatus for carrying out such a method.

To achieve the first object, in accordance with one aspect of the present invention, there is provided a method for manufacturing a Braun tube including a step of attaching a base, by means of an adhesive resin, to a portion of a Braun tube at a rear side thereof from which electrical connection terminals are protruded, wherein the method comprises steps of conveying the Braun tube while supporting the Braun tube on first conveying means with a faceplate thereof facing down, and locally heating an area around the base where the adhesive resin is deposited in a drying furnace disposed at an intermediate portion on the conveying path of the first conveyor, thereby drying and hardening or curing the adhesive resin.

To achieve the first object, in accordance with another aspect of the present invention, there is provided an apparatus comprising conveyor means, for conveying a Braun tube, having a support portion arranged to stably support the Braun tube thereon stationary thereto with a faceplate thereof facing down, and a drying furnace disposed at an intermediate position on a conveying path of the conveyor means for locally heating an area around the base where the resin is deposited to thereby dry and harden or cure the adhesive resin.

To achieve the second object, in accordance with still another aspect of the present invention, there is provided a manufacturing method further comprising, after the step of drying and curing the adhesive resin, a step of effecting knocking while conveying the Braun tube by a second conveying means with its faceplate facing down.

To achieve the second object, in accordance with yet another aspect of the present invention, there is provided a manufacturing apparatus further comprising a knocking means for effecting knocking after the adhesive resin has been dried and hardened or cured, the knocking means being disposed along the conveyor means at a location downstream of the drying furnace along the conveying direction of the conveyor means.

In the manufacturing apparatus according to a preferred embodiment the present invention, the conveyor means is preferably constituted by pallets and a conveyor. Each of the pallets has the support portion which is arranged to stably carry the Braun tube so that the Braun tube is held in a relatively fixed position thereto with a faceplate thereof facing down, and the conveyor preferably comprises a floor conveyor.

In a preferred embodiment of the present invention, since Braun tubes are carried on a conveyor such as a floor conveyor, for example, on individual pallets with the faceplates of the respective Braun tubes facing down, there is little risk that bases are oscillated during conveyance and, therefore, the relative position of each base to the associated pallet is fixed. Accordingly, a drying furnace can be minimized to a size large enough to locally heat the base and the portion deposited or coated with the adhesive resin. Furthermore, the capacity or power of an electric heater can be reduced and effective drying can be achieved.

Since the knocking step is effected with faceplates facing down, the position of each base is fixed as described above and, therefore, automatic attaching and removal of knocking sockets can be easily achieved. Furthermore, since Braun tubes are carried with their faceplates facing down, the positions of the bases are not deviated due to the weight of the knocking sockets, even if the knocking sockets are attached to the bases. In addition, since the adhesive resin is sufficiently dried in the drying furnace before the knocking sockets are attached, the insulation resistances among pin terminals do not decrease, and dust does not easily stick to the adhesive resin so that there is little risk of the insulation deteriorating due to the dust.

DESCRIPTION OF THE PREFERRED EMBODIMENT

A method of manufacturing Braun tubes in accordance with a preferred embodiment of the present invention and an apparatus for practicing such a method will be described below with reference to FIGS. 1 to 5.

Figure 1:
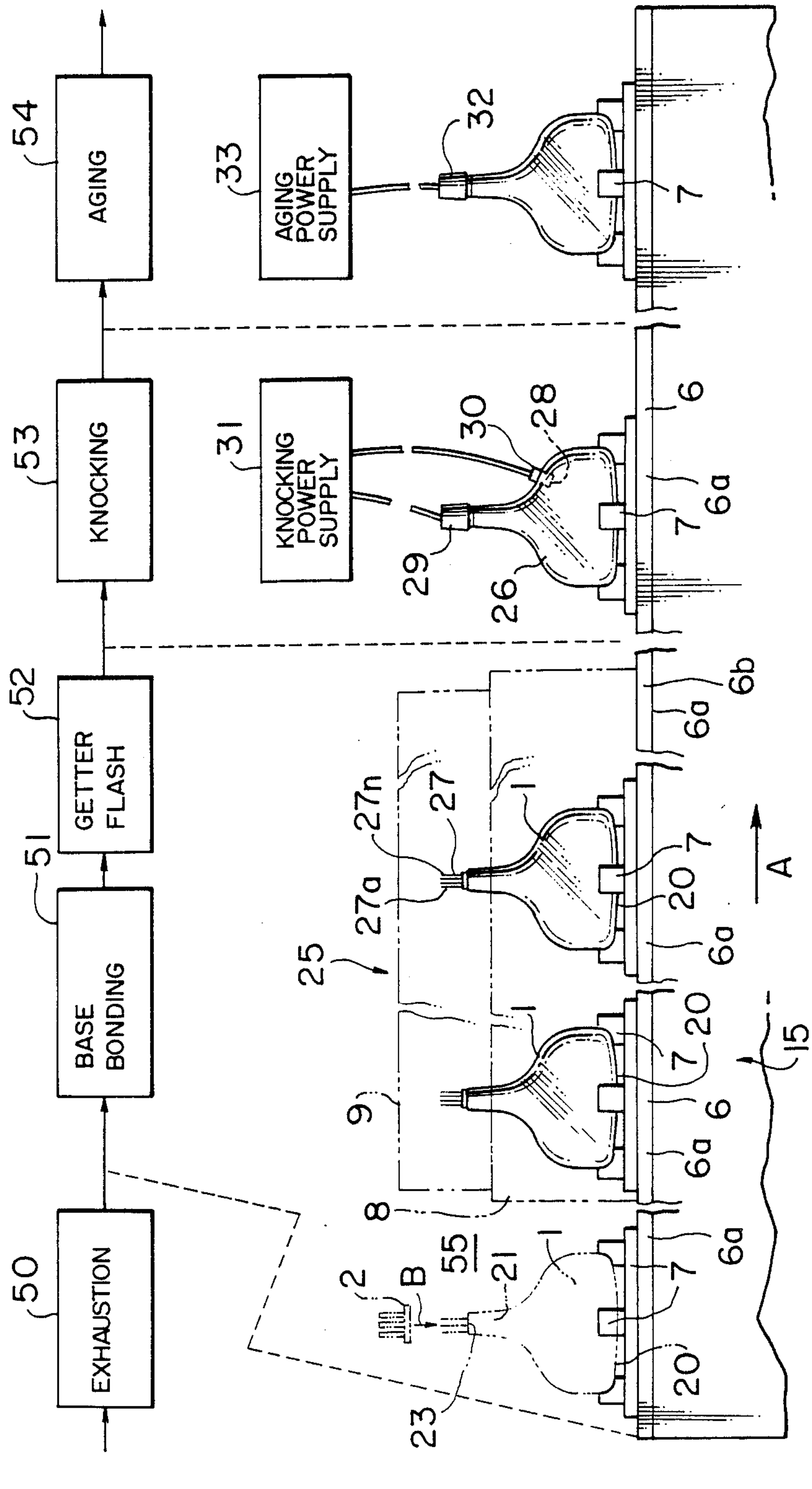
FIG. 1 is a schematic view which serves to illustrate equipment for carrying out a preferred embodiment of a method for manufacturing Braun tubes in accordance with the present invention.

FIG. 1 shows the equipment and apparatus, indicated generally by a reference numeral 15, which is provided after an exhaustion step 50 and which is utilized to practice the method of manufacturing Braun tubes in accordance with a preferred embodiment the present invention. Braun tubes 1 are sequentially exhausted or evacuated and sealed in the exhaustion step 50 and then transferred to a base bonding step 51. After the base bonding step 51, a getter-flash step 52 is performed in which a getter layer of Ba or the like is formed over the inner surface of each of the Braun tubes 1 in order to prevent a descrease in the degree of vacuum in the same. The getter-flash step 52 may instead be performed prior to starting of mounting of bases 2. After completion of the base bonding step 51 and the getter-flash step 52, a knocking step 53 is performed in which a voltage higher than the voltage (of the order of 25–30 kV) to be applied to the Braun tube 1 in normal use or during normal operation is applied across the electrodes of the Braun tube 1, thereby cleaning the electrode. After completion of the knocking step 53, an aging step 54 is performed in which the electron guns of the Braun tube 1 are aged by means of a process such as electrical heating of the heater of the cathode of the Braun tube 1. The Braun tubes 1 which have passed through the aging step 54 are sequentially transferred to a subsequent step.

Figure 2:
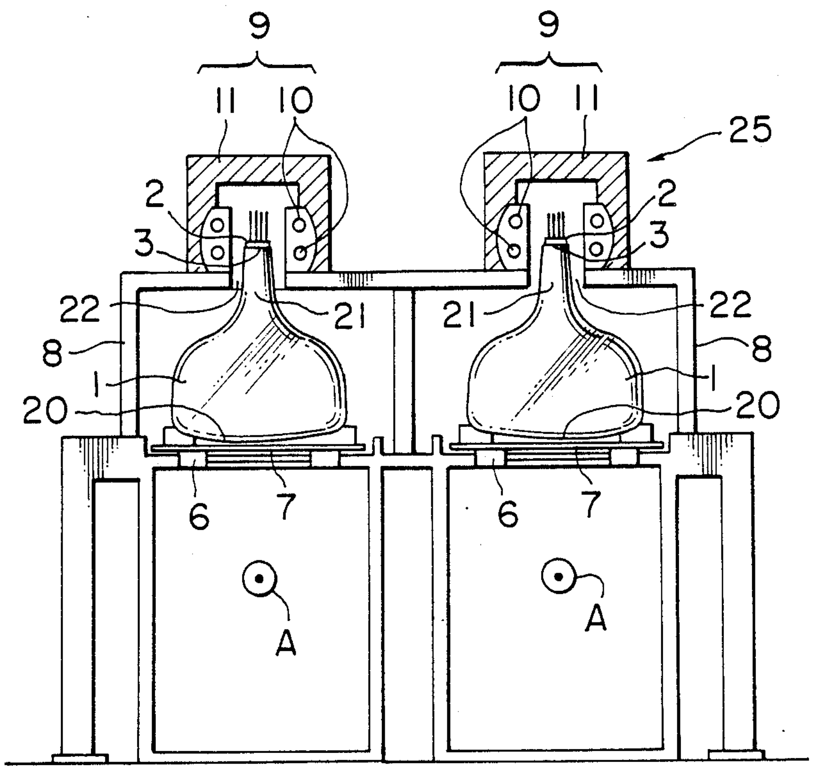
FIG. 2 is a schematic view, with portions broken away, of the base bonding device used in the equipment shown in FIG. 1 for carrying out the preferred embodiment of the method for manufacturing Braun tubes in accordance with the present invention.

In the base bonding step 51, as shown in FIG. 2, for example, two floor conveyors 6 are disposed in parallel with each other. The number of floor conveyors 6 may be one or more than two. In FIG. 1, the floor conveyors 6 are shown as disposed linearly, but they may be disposed non-linearly, for example, in a staggered manner in order to reduce the space required to install the conveyors 6. Pallets 7 are disposed on the floor conveyors 6, and they are moved at a constant speed in the direction indicated by an arrow A along the conveyors 6 while the conveyors 6 are being driven at a fixed speed in the same direction by a drive device (not shown). In a loading station 55 which is provided at the start of the base bonding step 51, as shown in FIG. 1, the individual Braun tubes 1 are sequentially carried on the pallets 7 with their faceplates 20 facing down.

Figure 3:
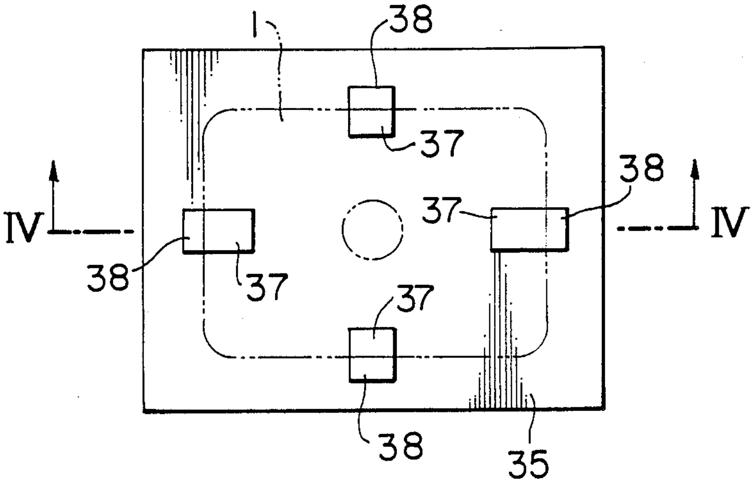
FIG. 3 is a schematic top plan view of a pallet used in the equipment shown in FIG. 1.
Figure 4:
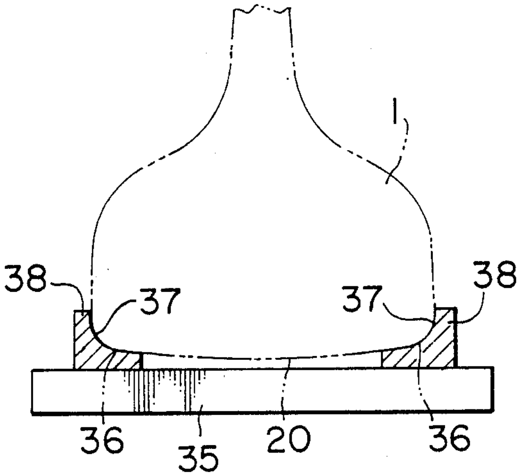
FIG. 4 is a cross-sectional view taken along line IV—IV of FIG. 3.

As shown in, for example, FIGS. 3 and 4 more in detail, each of the pallets 7 is constituted by a carrier 35 fixed to the constant-speed travelling portion of the conveyor 6 and supports 38 fixed to the carrier 35 and each having a supporting surface 37 whose configuration is in a mutually complementary relationship with the configuration of a peripheral portion 36 of the faceplate 20 of the Braun tube 1. The pallets 7 may be of any desired structure and configuration so long as they can stably support the Braun tubes 1 without relative motion.

Referring back to FIG. 1, while each of the Braun tubes 1 carried on the pallets 7 is being conveyed in the loading station 55, the base 2 is disposed or attached to an upper end 23 of a neck 21 of the Braun tube 1 in the direction indicated by an arrow B by means of the adhesive resin 3 (see FIG. 2). The adhesive resin 3 may first be deposited over the end 23 of the neck 21 or inside of the base 2. Depositing of the adhesive resin 3 and/or attachment of the bases 2 may be carried out either manually or by means of automated machines such as a robot-like programmed manipulator (not shown).

The Braun tube 1 to which the base 2 is attached by means of the adhesive resin 3 which has not yet hardened is conveyed together with the pallet 7 in the direction A by the operation of the floor conveyor 6. A furnace supporting frame 8 is stationarily disposed, as shown by imaginary lines in FIG. 1, at an intermediate location in the conveying path of the floor conveyor 6.

As shown in FIG. 2, grooves 22 are longitudinally formed in the furnace supporting frame or furnace supporting assembly 8 so as to allow the necks 21 of the Braun tubes 1 carried on the respective pallets 7 to project upwardly from the top of the furnace supporting assembly 8. Drying furnaces 9 of tunnel-like configuration are disposed on and fixed to the top of the furnace supporting assembly 8. Each of the drying furnaces 9 is constituted by an electric heater 10 which is disposed at a location which exactly corresponds to the height or level of the base 2 or the adhesive resin 3 and a furnace shell 11 made of heat insulating material to which the electric heater 10 is fixed. By way of example, the electric heater 10 is of the resistance heating type, but any desired type of heater may be employed.

In a base bonding apparatus 25 thus constructed, because the individual Braun tubes 1 are disposed on the pallets 7 carried on the floor conveyors 6 with their faceplates 20 facing down, the Braun tubes 1 can be stably supported and there is no possibility that oscillations or vibrations will take place in the portion of the base 2 during conveyance. Furthermore, the height of the bases 2 can be kept constant, and the bases 2 are ensured to be conveyed in the direction A along the longitudinal axis of the conveyors 6 which may be curved or straight. Accordingly, since the portion to be heated is limited to a narrow or local area, each of the drying furnaces 9 which are disposed at an intermediate location in the conveyance path of the floor conveyors 6 can be made small. Moreover, the capacity or power of each of the electric heaters 10 can be reduced and the adhesive resin 3 can be effectively dried. The approximate length of the tunnel-like drying furnaces 9 in the direction A may be selected so that, just when each Braun tube 1 leaves the drying furnace 9, the adhesive resin 3 completes hardening.

Figure 5:
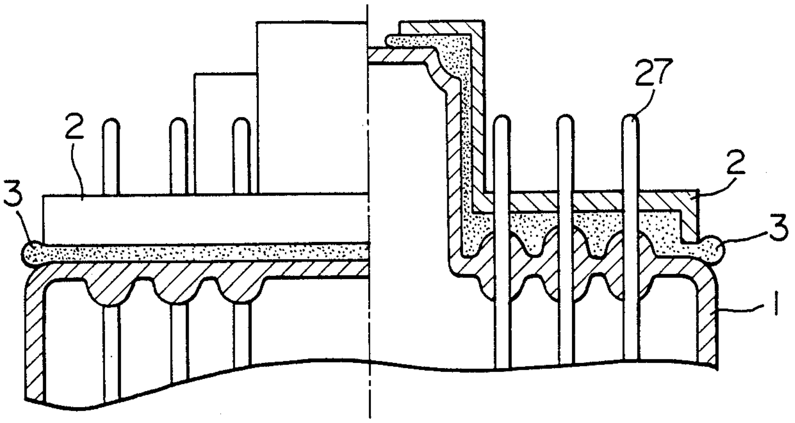
FIG. 5 is a sectional view illustrating attachment of the base portion with respect to the Braun tube by means of the adhesive resin.

Before the Braun tubes 1 leave the tunnel-like drying furnaces 9, the adhesive resin 3 of each of the Braun tubes 1 is cured or hardened and the base 2 is firmly secured to a predetermined position of the upper end of the neck 1 with terminals 27 extending through holes shown in base 2 as in FIG. 5. Referring back to FIG. 1, the thus-obtained Braun tube assembly 26 is conveyed to the knocking step 53 by the operation of the floor conveyors 6. In this knocking step 53, a high voltage for knocking purposes is applied from a knocking power supply 31 across the terminals extending through holes in the base 2 and an anode terminal 28 which is provided on the outer wall of the Braun tube 1, through an appropriate type of socket 29 and a connecting terminal 30, respectively. Formation of the electrical connections of the socket 29 and the connecting terminal 30, the application of a high voltage across them, and the release of the electrical connection and the voltage application may be totally or at least partially performed either manually or automatically by utilizing an automated machine.

Figure 6:
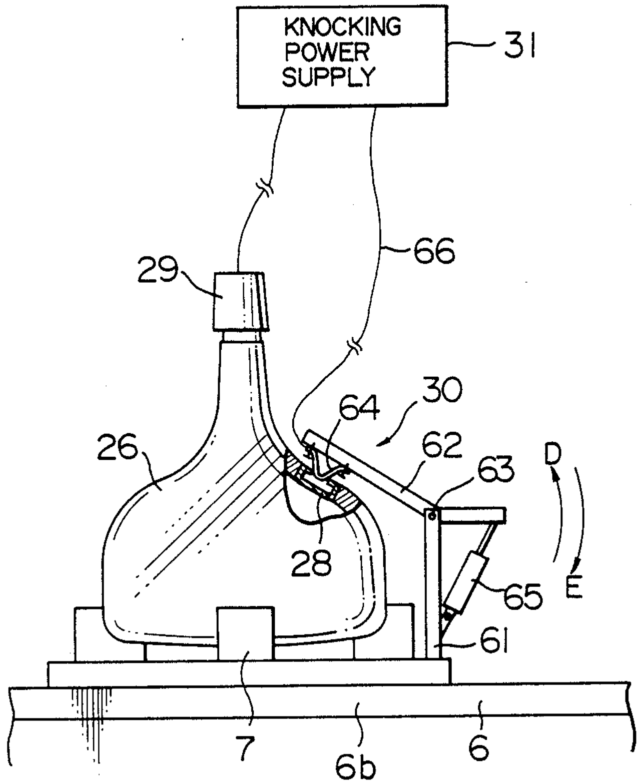
FIG. 6 is an example of automatic knocking device.

FIG. 6 illustrates an example of such automated machine or structure which comprises a support rod 61 fixed at a lower end to each of the pallets 7, a lever 62 pivotally connected to an upper end of the support rod 61 at a pivot 63, and a metallic contact strip 64 fixed to one end of the lever 62. The pivotal motion of the lever 62 with respect to the support rod 61 in the directions D, E is controlled by controlling the operation of a suitable driving device such as hydraulic cylinder device 65. When the lever is rotated in the direction D, the contact strip 64 is made in an electrical contact with the anode contact 28 and the knocking voltage is applied from the power supply 31 to the contacts 64, 28 through an electrical lead 66 which may be formed by conductors along the conveyor 6 at a knocking region and a brush fixed to each pallet 7 as well as a lead connected to the brush. Because the Braun tube assembly is stationary and stably supported on the associated pallet 7, the position of the contact 28 can be maintained stationary to the pallet 7 and the contact strip 64 connected to the pallet 7 through the lever 62 can be set/kept in contact with the anode contact 28 without failure.

When the knocking operation has completed, the drive device 65 is actuated to rotate the lever 62 in the direction E to release the electrical connection between the contacts 64, 28.

In the equipment and apparatus which are indicated generally at 15 in FIG. 1, the floor conveyors 6 are utilized in common for the purposes of both base bonding and knocking, and the pallets 7 in common for the same purposes. Accordingly, the cost of a conveyor system can be reduced and, in addition, a device for transferring the Braun tubes 1 from one place to another need not be disposed between the drying step 51 and the knocking step 53. However, a knocking floor conveyor *6b* which is employed in the knocking step 53 may not be integral with a drying floor conveyor *6a* which is employed in the base bonding step 51. For example, the separate conveyors *6b* and *6a* may be continuously disposed. Any type of conveyor which can carry and convey the Braun tubes 1 stably (without oscillation) with their faceplates 20 facing down thereon may be used as the conveyors 6, *6a* and *6b*.

In the equipment 15 and a method utilizing the equipment 15, since the Braun tubes 1 are loaded with their faceplates 20 facing down, the sockets 29 are located on the top of the respective Braun tubes 1. Accordingly, even if the adhesive resin 3 has not been completely cured when the Braun tube assembly 26 has left the tunnel-like drying furnaces 6, there is no risk that the position of the base 2 will deviate due to the weight of the socket 29 attached.

In addition, since the adhesive resin 3 can be sufficiently dried and cured before the socket 29 is attached, the adhesive resin 3 does not stick to the socket 29 and dust does not stick to the adhesive resin 3. Accordingly, the electrical insulation among adjacent pin terminals 27 can be maintained satisfactorily so that stable knocking operation can be carried out.

Figure 7:
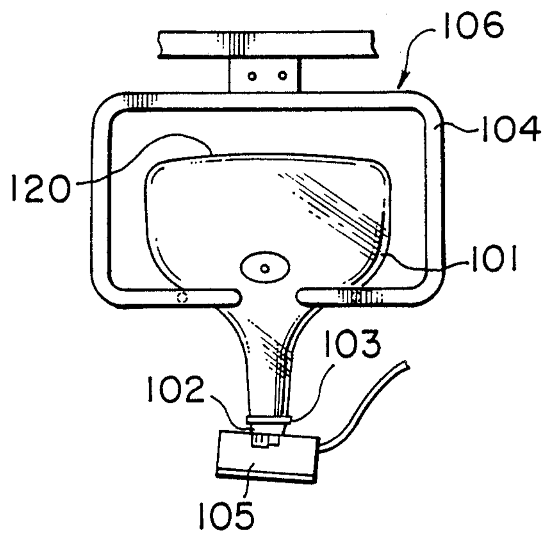
FIG. 7 is a front elevational view which serves to illustrate related art which provides the background of the present invention.
Figure 8:
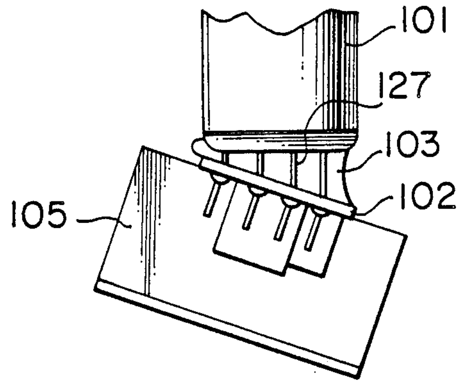
FIG. 8 is a view which serves to illustrate the deviation of the position of a base in the related art shown in FIG. 7.

On the contrary, if the trolley hanger 104 is, as shown in FIGS. 7 and 8, used to hold the Braun tube 1 with the faceplate 120 facing up, the position of the base 102 unavoidably changes due to oscillation or vibration of the trolley hanger 104. Therefore, if it is assumed that a drying furnace is disposed at an intermediate position on the conveying path of the aging trolley conveyor 106, the size of the drying furnace must be increased and hence the capacity or power of electrical heaters must be increased. This may lead to an increase in cost and a decrease in reliability in the step of drying. If it is assumed that a knocking socket is attached before drying, the position of the base 102 may deviate due to the weight of the socket 105 as shown in FIG. 8 and appropriate bonding (attachment) of the base 102 cannot be achieved. In addition, the density or amount of the resin 103 will become low or small at a region between adjacent pins 127 or air voids may be formed in the resin 103 because the resin 103 is pulled due to the deviation of the socket 105. Therefore, the withstand voltage of the resin 103 between the pins 127 is lowered and the knocking voltage should be made lower. Accordingly, no satisfactory knocking effect can be provided. In addition, dust floating in the ambient atmosphere may be attracted toward the terminals 127 owing to a high voltage applied for knocking purposes. As a result, the adhesive resin 103 or the socket 105 may be contaminated and its electrical insulation damaged.

In contrast, in the embodiment of the present invention, since the drying furnaces 9 are disposed at an intermediate location in the conveying paths of the respective floor conveyors 6, the above-described effects and advantages can be obtained.

When the knocking sockets 29 and 30 are removed and the knocking step 53 is completed, the Braun tube assembly 26 is further conveyed in the direction A by the operation of the conveyor 6 or another conveyor disposed in series with the same, and transferred to an aging step 54. In the aging step 54, an aging socket 32 is attached to the terminal 27 either manually or by an automated machine (not shown), and a desired magnitude of aging voltage is supplied from an aging power supply 33 to the socket 32 so that the electron gun in the Braun tube 1 is aged.

It will be appreciated from the foregoing that, in accordance with the present invention, small and inexpensive drying furnaces can be installed and the reliability of drying, knocking and withstand-voltage performance of Braun tubes is improved.

What is claimed is:

1. A method for manufacturing a Braun tube comprising: a step of attaching a base by means of an adhesive resin to a portion of a Braun tube at a rear side thereof from which electrical connection terminals are protruded; thereafter, conveying said Braun tube while supporting said Braun tube on first conveying means with a faceplate thereof facing down to a drying furnace disposed at an intermediate portion on the conveying path of said first conveyor and therein locally heating an area around said base where said adhesive resin is deposited, thereby drying and hardening said adhesive resin; and, thereafter, effecting knocking by applying a voltage across electrodes through said electrical connection terminals.

2. A method according to claim 1, wherein the step of effecting knocking is accomplished while conveying said Braun tube by second conveying means with the faceplate facing down.

3. A method according to claim 2, wherein said first and second conveyor means are constituted by a single continuous conveyor.

4. A method according to claim 2, wherein said second conveyor means is constituted by a separate conveyor which is disposed in series with said second conveyor means.

5. A method for manufacturing a Braun tube comprising: a step of attaching a base by means of an adhesive resin to a portion of a Braun tube at a rear side thereof from which electrical connection terminals are protruded; thereafter, conveying said Braun tube while supporting said Braun tube on first conveying means with a faceplate thereof facing down to a drying furnace disposed at an intermediate position of a conveying path of said first conveyor and therein drying and hardening said adhesive resin; and thereafter, effecting knocking while conveying said Braun tube by second conveying means with the faceplate facing down.

6. A method according to claim 5, wherein said first and second conveyor means are constituted by a single continuous conveyor.

7. A method according to claim 5, wherein said second conveyor means is constituted by a separate conveyor which is disposed in series with said second conveyor means.

8. An apparatus for manufacturing Braun tubes which comprises: means for providing an assembly of a Braun tube having a base disposed at a rear side thereof from which electrical connection terminals are protruded and having an adhesive resin between said Braun tube and said base; conveyor means for conveying said assembly and having a support portion arranged to stably support said Braun tube thereon stationary thereto with a faceplate thereof facing down; a drying furnace disposed at an intermediate position on a conveying path of said conveyor means for locally heating an area around said base where said adhesive resin is provided to thereby dry an harden said adhesive resin; and knocking means for effecting knocking by applying a voltage through said electrical connection terminals after said assembly passes through said drying furnace.

9. An apparatus according to claim 8, wherein said conveyor means is constituted by a floor conveyor.

10. An apparatus according to claim 8, wherein said conveyor means is constituted by pallets and a conveyor, said pallets each having said support portion which is arranged to stably support said Braun tube thereon stationary thereto with said faceplate thereof facing down.

11. An apparatus according to claim 10, wherein said knocking means is disposed along said conveyor means at a location downstream of said drying furnace along a conveying direction of said conveyor means.

12. An apparatus according to claim 10, wherein said conveyor continuously extends from an inlet of said drying furnace to said knocking means.

13. An apparatus according to claim 8, wherein said knocking means includes a socket which can connect to said electrical connection terminals to effect knocking and wherein said drying furnace is disposed at an intermediate position on said conveying path of said conveyor means for locally heating an area around said base to sufficiently cure said adhesive resin such that said base does not deviate from a portion of said Braun tube on which it is disposed and said socket does not stick to said adhesive resin.

14. A method according to claim 1, wherein said knocking is effected by connecting a socket to said electrical connection terminals and applying a voltage across said electrical connection terminals through said socket and wherein said drying and hardening is performed such that said adhesive resin is sufficiently cured such that said base does not deviate from said portion of said Braun tube to which it is attached and said socket does not stick to said adhesive resin.

15. A method according to claim 5, wherein said knocking is effected by connecting a socket to said electrical connection terminals and applying a voltage across said electrical connection terminals through said socket and wherein said drying and hardening is performed such that said adhesive resin is sufficiently cured such that said base does not deviate form said portion of said Braun tube to which it is attached and said socket does not stick to said adhesive resin.

* * * * *